Figure 1:
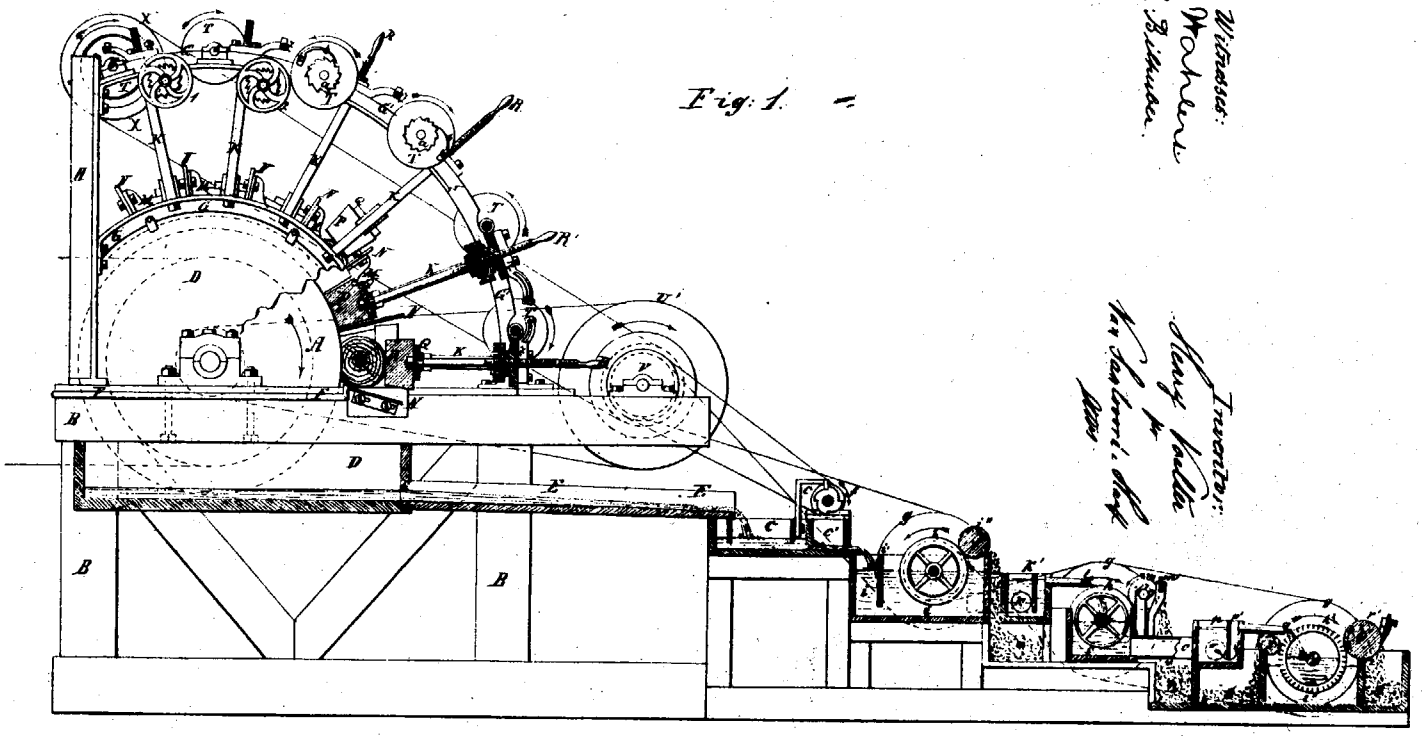

2 Sheets--Sheet 1.

HENRY VOELTER.

Improvement in Reducing Wood to Paper Pulp.

No. 4,418. Reissued June 6, 1871.

Witnesses:
C. Wahlers
E. Bilhuber.

Inventor:
Henry Voelter
per
Van Santvoord & Hoff
Attys

2 Sheets--Sheet 2.
HENRY VOELTER.
Improvement in Reducing Wood to Paper Pulp.
No. 4,418. Reissued June 6, 1871.
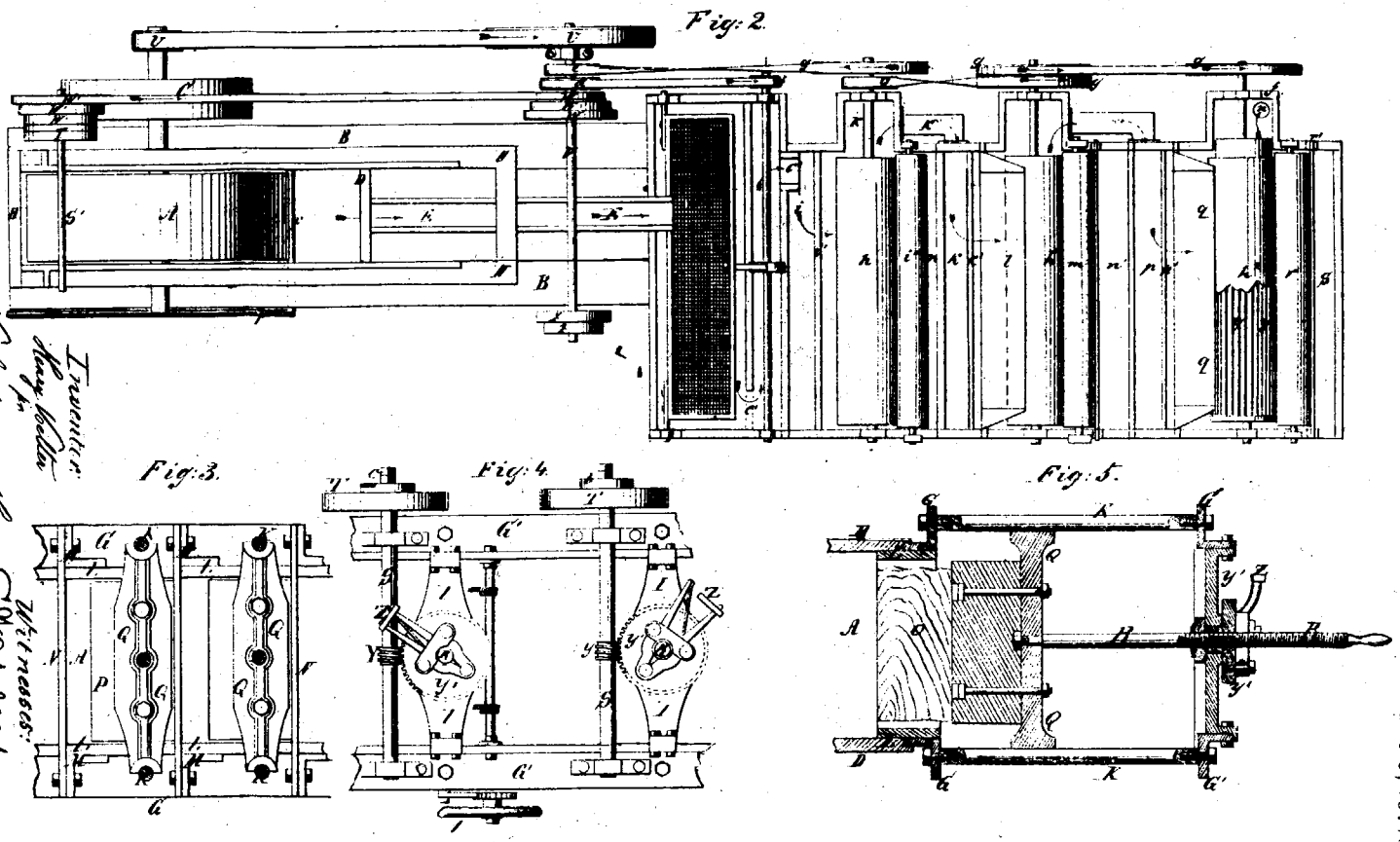
Inventor:
Henry Voelter
per
Van Santvoord & Hauff
Attys
Witnesses:
C. Wanert.
E. Bilhuber.

UNITED STATES PATENT OFFICE.

HENRY VOELTER, OF HEIDENHEIM, WÜRTEMBERG, ASSIGNOR TO ALBERTO PAGENSTECHER, OF NEW YORK, N. Y.

IMPROVEMENT IN REDUCING WOOD TO PAPER-PULP.

Specification forming part of Letters Patent No. 21,161, dated August 10, 1858; antedated August 29, 1856; reissue No. 3,361, dated April 6, 1869; extended seven years; reissue No. 4,418, dated June 6, 1871.

*To all whom it may concern:*

Be it known that I, HENRY VOELTER, of Heidenheim, in the Kingdom of Würtemberg, Germany, have invented a new and useful Improvement in the Art of Reducing Wood into Pulp, and also certain improvements in machinery therefor, and for feeding the wood to be reduced or ground so that its fibers may be acted upon by a stone, and further certain improvements in apparatus for assorting pulp or fibers of wood.

The art of reducing wood to pulp by subjecting the same to the action of a revolving stone is not a new one, machinery for grinding wood while a current of water was applied to the stone having been patented in France by Christian Voelter as early as 1847, (see 10th volume, 2d series, Brevets d'Invention,) and in England by A. A. Brooman, of London, in 1853. (See Repertory of Patented Inventions for May, 1854, page 410.)

In all the processes known or used prior to my present invention the wood had been acted upon by the stone in one of two ways—viz., either by causing the surface of the stone to act upon the ends of the fibers, the surface of the stone moving substantially in a plane perpendicular to the fibers of the wood; or, secondly, by acting upon the fibers in such a direction that they were severed diagonally, the surface of the stone moving diagonally across the fibers. The first plan, in fact, made powder of the wood. The pulp had no practical length, and on trial proved worthless, or nearly so. The second plan was carried out by the use of a stone revolving like an ordinary grindstone, the wood being applied upon the cylindrical surface thereof, with the fibers perpendicular, or nearly so, to planes passing through the axis of the stone and the point or locality where the grinding was performed; and this plan also failed, because the fibers were cut off in lines diagonal to their own length, and were consequently too short to make good pulp. There were other difficulties attending the process not necessary here to mention. Such was the state of the art prior to my invention; and My improvement in the art consists in grinding or rather tearing out the fibers from the bundle of fibers which makes up a piece of wood by acting upon them by a grinding-surface which moves substantially across the fibers and in the same plane with them. In carrying out my improvement upon the art I split a log of wood and apply the flat side upon the stone, and then so revolve the stone as to cause points upon its surface to pass the fibers in lines perpendicular, or nearly so, to the length of the fiber. By this mode of procedure I obtain a sufficiently long fiber, and, as far as I can discover, save much power. My improvement in the art consists, further, in regrinding the fibers by causing them, after being separated from the block, to pass under other blocks of wood, which are being reduced to pulp upon the same stone. The fibers torn out at the first operation are thus rolled over and crushed again and separated into smaller fiber.

My improvements in the machinery are in an arrangement of cells with reference to the grinding-surface, so as to hold the blocks of wood in such position that their fibers may be separated from the blocks in the manner described, and whereby fibers may be reground; and in a contrivance for feeding up the blocks by a positive feed instead of by force derived from weights or springs, as formerly practiced; and a contrivance for causing the feed to cease automatically, substantially as hereafter described and specified.

My improvements in apparatus for assorting the pulp are in certain combinations of devices, as hereafter set forth.

In the accompanying drawing making part of this description, Figure 1 is partly an elevation, partly in section, of the apparatus both for rolling out the small fibers from the wood and for assorting the pulp thus produced. Fig. 2 is a plan or top view of the same, the boxes for holding the wood and the feeding apparatus being removed, also the tops or covers of the water-channels, conducting-pipes, and receiving-boxes. Figs. 3, 4, and 5 are views in detail of the cells for holding the blocks of wood, the feeding contrivances, &c., and these figures represent the contrivances employed by me for carrying out my improvement in the art, and also my improvements in machinery and apparatus in the best form known to me.

In the drawing, A A, in Figs. 1, 2, and 5, designate a cylindrical grindstone, of any suitable width and diameter, employed for reducing the blocks. It is fixed in a vertical position on a shaft turning in suitable bearings, and mounted upon or between the strong wooden framing B, the sides of said framing being tightly planked up to form a water-tight casing, D D, for the stone to revolve in. Said stone receives a rotary motion at the rate of one hundred and twenty to two hundred and fifty revolutions per minute, according to size and diameter, from the main pulley C, Fig. 2, and a driving-belt connected with the line-shafts or engines. The under part of casing or box D D is provided with an outlet, E, for the ground pulp and the water which is introduced by the pipe F for the purpose of wetting the stone and mixing with the pulp during the operation of grinding. G G and G′ G′, in Fig. 1, are strong iron arches or side frames of suitable dimensions to receive the feeding apparatus and the auxiliary machinery connected therewith. They are strongly and firmly bolted to the main framing B by means of the iron bed-plate and standard H H, while their vertical and parallel position is maintained by iron braces or traverses I I, (see Fig. 4,) the latter forming, at the same time, the support of the driving machinery actuating the feed of the blocks. Additional connections between the arches G G and the outer segments G′ G′ are established by the employment of wrought-iron columns or rods, K K K, bolted, at proper distances, firmly between them, keeping the arches in a proper relation to each other and rendering the whole a firm and substantial structure. The inner arches G G, encircling the stone on each side, form a water-tight joint with the casing D, while their inside faces are lined with the wooded segments L L, Fig. 5, slightly lapping over the edges of the stone so as to prevent the fibers when separated, or any other foreign substance, from passing between the casing and the stone and causing friction or accident. M M M are brackets, cast at suitable distances apart upon the outer rims of the two arches G G. They are made to receive the plates N N, the latter fitting closely between the arches G G, and forming thereby the partitions of regular and separate boxes or cells, which, being located behind each other on the circumference of the stone, serve as recipients for the blocks to be reduced.

It is obvious that any number of such boxes may be applied, of any desirable size to suit the dimensions of the stone. It is, however, essential that they should not be carried any further around its circumferential surface than indicated by Fig. 1—that is to say, not much over the right or left hand upper quarter of the stone, according to the direction of its rotation. It is also important that the revolving motion of the stone should always take place in the direction indicated by the arrow in Fig. 1 when the boxes containing the wood are placed as shown in said figure. O O, in Figs. 1 and 5, represent the blocks of wood when in contact with the stone for the purpose of being reduced, and these blocks lie in cells with the grain or lengthwise direction of the fibers across the stone, the cells being constructed so as to receive the blocks and hold them in that position. The fibers of wood, therefore, are acted upon by the grinding-surface, so that they are, as it were, torn or rolled out of the bundle of fibers which makes up the block without any cutting of the fibers across, either perpendicularly or diagonally, as was the case in all former processes for converting wood into pulp by mechanical operations.

The wood, of course, is first cut and split into pieces of suitable length, and then prepared for the operation by freeing it from bark, knots, and adhering foreign matters; and it must be remarked that almost any kind of wood can be made use of, according to the quality and color of the paper to be produced. The drawing shows that fibers rolled out or ground out of the bundle of fibers which makes up any one block of wood will, after being separated from the block, be, by the action of the grinding-surface, carried under the next block, and such separated fibers will, therefore, be rolled over between that next block and the stone and separated into finer filaments. The fibers are, therefore, reground upon the same apparatus which originally separated them from the block, and this regrinding, by arranging several blocks upon the same stone in such wise that fibers ground from one block are reground while passing under a second and succeeding block, is an important step in the art.

It now remains to explain the automatic and self-intercepting action of the feed-motion. From observing Figs. 1 and 5, it will be perceived that the blocks are acted or pressed upon by the followers P P so as to distribute a regular pressure on the whole surface of the blocks. These followers P P are bolted firmly to the iron press-plates Q Q, and the latter terminate in the spindles or feed-screws R R R, extending outward and passing through apertures in the traverses I I, so that, by pulling or pushing the spindles R R R out and in, or by raising or lowering the same, the pressure-plates Q Q, with their followers P P, are brought to act upon the blocks O O, the supporting-columns K K K serving at the same time as guides to keep the said plates Q Q and spindles R R in a rectilinear direction and at right angles with the blocks, as shown in Fig. 3. Around the circumference of the outer framing G′ G′ is located a number of cross-shafts, S S S, having their stationary bearings firmly secured upon the rims of said framing and carrying on their extremities the driving-pulleys T T T, a rotary motion being transmitted to them in the following manner, viz: A small driving-pulley, U, is keyed upon the outer end of the grindstone-shaft to convey a suitable motion to the counter-shaft V. This shaft V may be set somewhere upon the main framing B B, or attached to bearings in any position fit to convey motion by a belt to the uppermost and first cross-shaft S′, by aid of the cone-pulleys W W W and W′ W′ W′, whereby the speed of the shaft S′, and consequently of shafts S S S, can be varied at pleasure. These shafts are to revolve with the first shaft S′, which may be effected by running the endless band X from pulley T alternately above or below the rims of the pulleys T T T of shafts S S S. Motion being thus conveyed to these shafts by the reducing agent, or stone itself, it is evident that said shafts will at any moment partake of the least changes in the velocity of the stone, and, if they are made to actuate the feed, control the same accordingly. To accomplish this a worm, Y, is placed and secured upon each of the shafts S S S, Fig. 4, to gear with and give a slow motion to the worm-wheels Y′ Y′. The traverses I I I form the support and the stationary bearings for the wheels by letting their hubs pass through the centers of the traverses in such a manner as to allow the wheels to turn freely upon them. To keep the wheels in their proper position to the worms and within their bearings a strong collar is shrunk on or otherwise fastened to the projecting ends of the hubs, forming a solid shoulder to bear against, and preventing, thereby, the wheels from rising when power is applied. The hubs of the wheels Y′ Y′ Y′ are bored out sufficiently large to receive the feed-screw or spindles R, and to allow them to slide freely through and over the threads of the spindles, and to admit of raising or lowering them by taking hold of their handles R′. Z Z, in Figs. 1 and 5, designate a pair of iron jaws, provided with spring and catch to readily open and close when required; one of these jaws being firmly secured and bolted to the upper face of each wheel, Y′ Y′, partaking, thereby, of its rotary motion, while the inner concave surfaces of the said jaws contain screw-threads matching with those of the feed-screws and the jaws, by encircling the screws, after the same have passed through the traverses, and the hubs of wheels Y′ Y′ form thus the halves of a nut. It is, therefore, obvious that by closing the jaws and giving motion to the wheels Y Y they—that is to say, the jaws forming the nut—will revolve and act upon and urge down the feed-screws, together with the plates Q Q, and this in proportion to the velocity given to the worm-shafts S S. By simply opening the jaws Z the screw is readily disengaged. It may then be pulled back and made ready again to descend. To facilitate this drawing back, or rather raising, of the uppermost screws, being not within the reach of the attending workman, little hand-wheels 1 and 2, Figs. 1 and 4, mounted on small cross-shafts, have been provided for hoisting up the spindles by aid of a rope and drum, or a similar lifting device.

An arrangement of the foregoing description, when combined and constructed as proposed, constitutes an automatic feeding apparatus, in which the amount of feed or rate of progression of the wood toward the stone depends upon the velocity of the stone and is not affected by the amount of superficies of the block being ground. Now, in order to render it at the same time self-intercepting, for the purposes already stated, the following arrangement has been resorted to: The pulleys T T are not keyed fast upon the worm-shafts S S S, but are made to run loosely upon them. They are facing, however, the disks or ratchet-wheels *a a*, which are fixed upon the shafts, as shown in Fig. 1, where, for the sake of a better understanding, two of these shafts are represented turned over, thereby showing the ratchets and pulleys in front. The pulleys carry the steel springs *b b*, pressing firmly upon the ratchet-wheels, and with a tension so adjusted as to move the shafts S S S, and consequently to operate the feed when the machinery is in an ordinary and regular state of working, but letting loose instantly and intercepting or stopping for the time the action of the feed when an undue friction takes place, or a diminished pressure upon the blocks is momentarily required. Should one or the other of the blocks be reduced or ground up sooner than the attending workman might expect it, the same contrivance will indicate the fact by a noise sufficiently distinct to call his immediate attention, and prevent the machinery from serious breakages, which inevitably would occur by working up the spindles and plates against the framing G G, and further than the guide-rods K K will permit. The machinery as described is self-acting. It requires no further assistance than to supply the box with fresh material when one or the other of the blocks is reduced. Nor does this manipulation demand a minute's delay or the stopping of the machine, as it simply consists in the opening of the nut or jaws Z, the pulling back of the screws R R for the introduction of the material, and the reclosing of the nut Z, when the feeding up is resumed and continued without further assistance.

Having now minutely described my improvements in the art and the machinery, I will now proceed to explain that part of this invention which is the apparatus for assorting the fibers when separated from the wood. E E, in Fig. 1, as already stated, is an outlet and channel of the casing D D for the purpose of leading or carrying the watery pulp to the cylinder. This pulp first passes from the channel E E E into the shaking-frames C C, covered with sieves of the coarsest gages, and constructed on what is termed Donkin's plan, which is an old well-known contrivance. The shaking or rocking motion naturally pertaining to its construction, as well as the rotary motion of the succeeding and separating cylinders, is conveyed by one and the same counter-shaft, V, by aid of the pulleys *d* and *e* and the pulleys *f g* in Fig. 2.

The shaking-frame C C in this apparatus serves only to throw out and separate extraneous substances and such fibers as are unfit for paper-making. In most cases, however, it would be advisable to employ a large cylinder in its stead, of a construction similar to that of the assorting-cylinders hereinafter described. The mode of assorting the pulp after leaving the frame C C is very simple, and has, in its nature, already been described. I will, therefore, merely refer to the details of the apparatus as represented in the drawing.

In Figs. 1 and 2, $h$ $h^1$ $h^2$ indicate the rotating cylinders, their entire surfaces covered with sieves of gradually increasing fineness—say from sixteen up to two thousand meshes per square inch—and it is very essential for the good working order of the cylinders that the sieves should be very carefully and accurately put on. To facilitate this the circumferences should be provided with a sufficient number of strips $y$ $y$ $y$, running throughout the length of the cylinders, as shown at $h''$, Fig. 2, for the sieves to fasten or screw to. Rollers turning in stationary bearings may also be employed instead of strips to support the sieves. The latter might then revolve or rotate upon the rollers, and independently of the shafts of the cylinders. The last cylinder $h^2$ is covered with sieves of the finest gages. It is called the pulp-catcher, in as far as it terminates the assorting process by taking up or catching within itself the finest particles of the pulp, the waste water being allowed to flow off entirely through the channel $t$ $t$ and the pipe $u$. My improvement in assorting apparatus is based upon the employment of revolving cylinders for the purpose of dividing the finer particles to pass through these cylinders—that is, to enter through their perforated surfaces and into the interior portion of the same, while the coarser particles are scraped off from without.

It is evident that the only communication existing between the cylinders succeeding each other in the separation should be through the meshes of the sieves they are covered with, and that the water and watery pulp contained, for instance, in the trough and around the exterior of the first cylinder, can only reach the following finer one by passing through the sifting-envelope of the former. The cylinders $h$ $h^1$ $h^2$ are, therefore, tightly closed upon one end, while the other and open end of each cylinder communicates with the conducting-pipe and distributing-trough of the following cylinder, as seen in the elevation, Fig. 1, and the top view, Fig. 2. The letter $i$ designates the first receiving-trough in which the cylinder $h$ revolves. The pulp and water are carried into it after leaving the frame C C, and after having passed through the channel C′ C′ in the direction of the arrow at Fig. 2. To prevent sand and particles of stone, &c., from getting into the trough $i$ $i$ and upon the cylinders, the passage through the partition $c'$ is somewhat raised—say one inch or so. This forms a sort of a weir for the mass to flow over, and causes the heavy and hard substances to settle. It is most essential that the flow of water and pulp be as uniform as possible, and that the sheet of the liquid touching the cylinders be spread evenly over their surfaces. To achieve this, partitions $i$ K′ $p'$ are inserted in the troughs and reservoir $i$, $h$, and $p$, so that they separate the body of the water at the surface and allow it to communicate only underneath and at the lowest point of the water. The mode of separating by letting the pulp flow into the surrounding trough, instead of leading it directly upon the rotating cylinder, is illustrated in Fig. 1 of the drawing at the first cylinder $h$ and its trough $i$ $i$. The mass in said cylinder is slightly agitated by the rotation of the cylinder, and the coarse fibers adhering without are taken up by the touching-roller and separated while the water and particles are entering the sieves. This finer pulp, with the water, next reaches the receiving box or reservoir K K by aid of the conducting-pipes communicating with the interior cylinders $h$. It is then caused, owing to the lower position of box K, to flow by its own gravity evenly and gently over the apron $l$ $l$ and upon the surface of cylinder $h$. The separation here is continued in the same way, by letting the pulp spread directly over and upon the sieves $h^1$, the coarser fibers being again taken up and separated by the roller $i^2$ touching upon said cylinder, and so on. The letters $i^2$ $m$ $r$, in Figs. 1 and 2, show the various take-up rollers. They are made of wood, carefully covered with flannel, rubber, or other soft substance. There may also be employed one, two, or more of such rollers in contact with each cylinder, according to its size and working capacity. Straight bars or doctors, running closely along the surface of the rollers, as seen at $m'$ and $r'$ in Figs. 1 and 2, serve to scrape off and deliver from the rollers the separated fibers received from the cylinders, and to deposit them, according to their respective fineness, in the different boxes $n$ $n'$ S S′ provided therefor. The still finer pulp, having penetrated the meshes of the cylinder $h^1$, again passes through it and into the conducting-channel $o$ $o$, thence to the next receiving-box $p$, and, for the reasons set forth, it is once more compelled to descend or flow over the apron $q$ $q$ upon the cylinder or pulp-catcher $h^2$, which in the drawing terminates the separating process. The entrance into this cylinder by the finest and very best portion of the pulp takes place precisely the same way as before stated, and the outside separation is again effected by the rollers $r$ $r$ and the doctors $r'$ $r'$. To more readily collect the finest pulp in the cylinder $h^2$, a series of small buckets may be placed and secured within in such a manner as to cause the waste water to escape freely through the channel $t$ $t$. The trough $i''$ $i''$ of cylinders $h^2$ is of a semicircular shape, to prevent the fibers from collecting or settling at the bottom or in the sharp corners, increasing thereby the constant taking up of the mass by the rotation of the cylinder.

It is here necessary to remark that the pulp, before reaching this last cylinder, may pass over two more intermediate sieves or cylinders of increasing fineness, and it will only be necessary to give them and their surrounding troughs *i i′ i″* the proper degree of declivity to secure an easy and gentle descent of the pulp.

Having thus described my improvement in the art of making pulp from wood, in machinery employed in grinding and regrinding pulp, and in apparatus for assorting the same, I claim as my invention—

1. The improvement in the art herein described, which consists in tearing or grinding out fibers from blocks of wood, in the manner substantially as described, without cutting or severing the fibers either perpendicularly or diagonally to their length, as heretofore practiced in this art.

2. The improvement in the art herein described, which consists in regrinding the fibers already separated from the block by grinding them over again between another block and grinding-surface.

3. In combination, a grinding-surface and cells or boxes for blocks of wood, so constructed and arranged with reference to the surface that the fibers of blocks of wood placed therein lie in the plane, substantially, of the grinding-surface, and across the line of motion of points in the grinding-surface, as described.

4. In combination with a revolving grinding-surface, blocks of wood so held thereon that their fibers are in the relation to the surface and to the motion of points thereon substantially as herein described, so that by the operation of the grinding-surface upon the blocks fibers will be separated from the same without being cut across.

5. In combination, cells for holding blocks of wood and a revolving grinding-surface, where the cells are so arranged in reference to each other and to the grinding-surface, substantially as described, that fibers torn out or ground from one block shall, by the motion of the grinding-surface, be carried under a succeeding-block and there reground, substantially as described.

6. Feeding the blocks to be converted into pulp to the stone by mechanism, substantially as herein described, whereby the blocks are forced forward by a motion dependent upon the velocity of the revolving grindstone.

7. The contrivance, substantially as herein described, whereby the feeding motion is intercepted or stopped automatically.

8. The separating apparatus as improved by me, and consisting, essentially, of a series of perforated revolving cylinders, in combination with take-up rollers, channels, and troughs, substantially as described.

HENRY VOELTER.

Witnesses:

GUSTAV SCHOLL,
ARTHUR TISCHER.